3,039,846
METHOD FOR THE RECOVERY AND PURIFICATION OF GASEOUS UF$_6$ FROM GASEOUS MIXTURES AND UF$_7$NO AND UF$_7$NO$_2$ PRODUCTS PRODUCED THEREBY
Pearl R. Ogle, Jr., Chillicothe, Ohio, assignor to the United States of America as represented by the United States Atomic Energy Commission
Filed Oct. 9, 1961, Ser. No. 143,986
8 Claims. (Cl. 23—14.5)

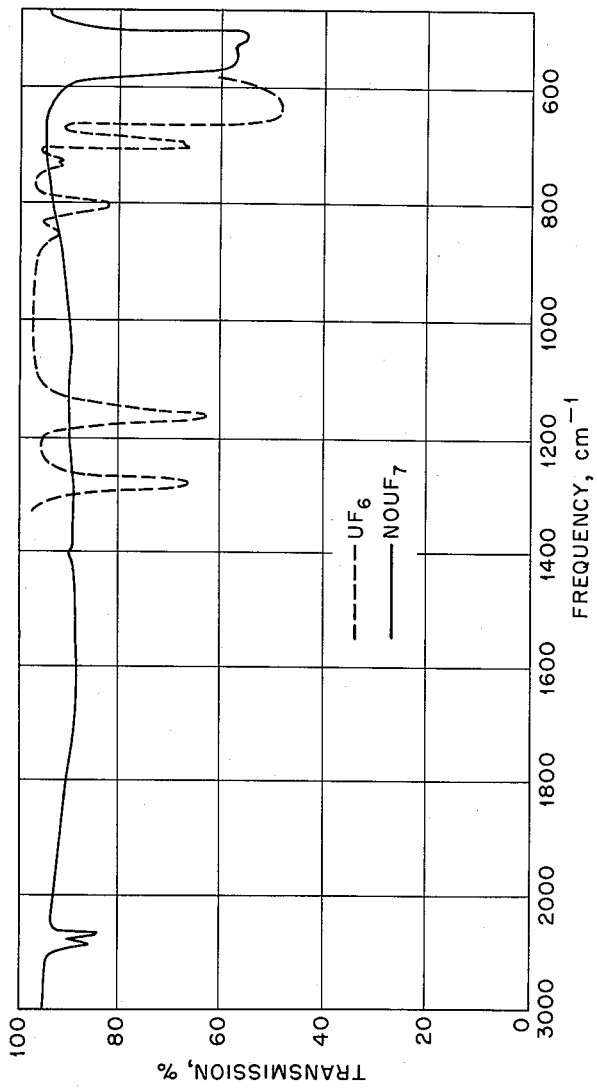

The present invention relates to a new and useful class of chemical reactions involving gaseous uranium hexafluoride and to a new and useful method of recovering and/or purifying gaseous uranium hexafluoride values from a gaseous mixture containing said values by utilizing said reactions.

There are many ways of synthesizing uranium hexafluoride. A number of methods for the preparation of uranium hexafluoride are disclosed in chapter VIII of "The Chemistry of Uranium" by Katz and Rabinowitch, National Nuclear Energy Series, VIII–V, McGraw-Hill, 1951. Regardless of its source, a synthesized UF$_6$ product is usually found as a component of a gaseous mixture from which it must be separated to a high degree of purity. The most common volatile impurities in a gaseous stream containing UF$_6$ include, among others, gaseous fluorine, chlorine, bromine, oxygen, hydrogen chloride and inert gases such as nitrogen, argon, hydrogen fluoride, carbon dioxide, and carbon monoxide.

It is accordingly an object of this invention to provide a method of removing and purifying gaseous UF$_6$ from a gaseous stream.

Another object of this invention is to provide a method of converting gaseous UF$_6$ into a form from which it can easily be regenerated.

A further object of the invention is to provide a useful and novel class of chemical reactions and uranium compounds resulting therefrom whereby the preceding objects can be achieved.

With these and other objects in mind the present invention comprises in its method aspect, the steps which comprise reacting a gaseous stream containing UF$_6$ and extraneous gaseous impurities at a temperature in the range $-100°$ to $50°$ C. with a compound selected from the class nitrosyl fluoride and nitryl fluoride and thereafter separating a solid uranium fluoride product having an empirical formula UF$_7$N(O)$_x$, where $x$ is a number from 1 to 2.

The following examples will serve to illustrate the preparation of the compounds of this invention.

*Example I*

This example illustrates the preparation of UF$_7$NO.
Uranium hexafluoride (6.956 grams, 0.0198 M) was condensed into a vacuum-tight fluorothene reactor at $-196°$ C. and, at the same temperature nitrosyl fluoride, NOF (1.635 grams, 0.0334 M), was condensed on top of the UF$_6$. The mixture was warmed to $25°$ C. and allowed to react at that temperature for about 16 hours. All volatile components were evacuated from the reaction mixture after which 7.948 grams of a greenish-white solid was recovered. The reaction was presumed to occur as follows:

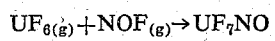

An elemental analysis of the solid was conducted and the following results obtained.
Theory based on UF$_7$NO: U, 59.36; F, 33.16; N, 3.49.
Found: U, 58.98; F, 29.66; N, 3.58.

An infrared spectrum of the solid was obtained and is shown in the accompanying FIGURE. For purposes of comparison, the principal characteristic absorption peaks of UF$_6$ are superimposed. The absorption bands at 2320 and 2318, and 549 to 510 cm.$^{-1}$ are attributed to the NO$^+$ and UF$_7^-$ ions, respectively, this indicating that the compound UF$_7$NO is a 1:1 addition complex having a composition NOF.UF$_6$. This compound has a vapor pressure of less than 1 mm. Hg at $25°$ C. with the vapor over the solid comprising approximately equal molar quantities of uranium hexafluoride and nitrosyl fluoride.

*Example II*

This example illustrates the preparation of UF$_7$NO$_2$.
The procedure of Example I was used to react UF$_6$ and nitryl fluoride. A greenish-white solid having a vapor pressure of 11.6 mm. Hg at $25.7°$ C. was obtained. The reaction was presumed to occur as follows:

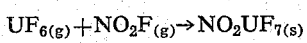

An infrared spectrum of this compound revealed an absorption based at 2374 cm.$^{-1}$ which is indicative of the NO$_2^+$ ion. Characteristic absorption bands of NO$_2$F and UF$_6$ were also observed.

An elemental analysis of the compound was obtained and compared with elemental composition for UF$_7$NO.
Theory based on UF$_7$NO$_2$: U, 57.08; F, 31.89; N, 3.36.
Found: U, 57.23; F, 28.51; N, 3.64.

Based on the infrared spectrum and chemical analysis, it was concluded that the compound had the composition of a 1:1 addition complex NO$_2$F.UF$_6$. The vapor above this compound comprises approximately equal molar quantities of uranium hexafluoride and nitryl fluoride NO$_2$F. The reaction of UF$_6$ with either nitrosyl fluoride or nitryl fluoride effects no change in the uranium oxidation state of UF$_6$. Thus when either UF$_7$NO or UF$_7$NO$_2$ is dissolved in water, it results in a solution containing hexavalent uranium, as the uranyl ion, and nitric acid. This is to be compared with the reaction product of NO or NO$_2$ with UF$_6$ which yields a solid UF$_6$N(O)$_x$, where $x$ is a number from 1 to 2. Compounds of the class UF$_6$N(O)$_x$ (which are disclosed and claimed in application S.N. 19,132, of common assignee) when dissolved in water, give a mixture of tetravalent uranium and hexavalent uranium while UF$_6$, UF$_7$NO and UF$_7$NO$_2$ dissolved in water yield the hexavalent uranyl ion only.

In order to utilize the compounds of this invention for the purposes of recovering gaseous UF$_6$ from a gas mixture, it is only necessary to react the mixture with nitrosyl or nitryl fluoride at a temperature not exceeding about $40°$ C. and preferably at a pressure below the vapor pressure of such compounds. The UF$_6$ will react virtually immediately to form the solid addition compound. The solid compound is allowed to settle or is filtered off and the volatile contaminants are removed by purging or under vacuum. This method is particularly valuable for recovering uranium hexafluoride from gas streams containing low concentrations or traces of uranium hexafluoride. As between using nitrosyl or nitryl fluoride, nitrosyl fluoride is the preferred reagent since it forms a compound of lower volatility.

The unique advantage in using these compounds to recover UF$_6$ is that the uranium does not undergo a valence change. Moreover, the resultant compounds can easily be decomposed, preferably in vacuum, at slightly elevated temperatures, over about $50°$ C. to regenerate the desired UF$_6$. This is to be compared with other methods for stripping UF$_6$ where chemical traps are used to strip the last traces of UF$_6$ from gases. Essentially all the UF$_6$ can be removed by passing the UF$_6$ containing gas through a bed of calcium sulfate, calcium fluoride or activated alumina or by scrubbing the gas with water, but expensive wet processing methods are necessary to recover the uranium from the solids.

The reaction between UF$_6$ and nitrogen oxyhalides other than the nitrogen oxyfluorides can also be used to recover $UF_6$ gas from a gas stream. However, in a sense, the rotation product is not analogous to $UF_7NO$ or $UF_7NO_2$. For example, the reaction product of $UF_6$ with gaseous or liquid nitrosyl chloride yields nitrosylium hexafluorouranate $UF_6NO$, a compound in which the apparent oxidation state of uranium has been changed as evidenced by the presence of $U^{+4}$ in aqueous solutions of $UF_6NO$. Other oxyhalides follow the reaction pattern of nitrosyl chloride rather than nitrosyl fluoride to effect at least a partial reduction of the hexavalent uranium of $UF_6$. All of the nitrogen oxyhalides, however, may be used to recover and purify $UF_6$ from a $UF_6$ containing gas stream. The choice of oxyhalide will depend on the uranium oxidation state desired in the final product. If the hexavalent uranium is desired to be retained, then the choice will be nitrosyl and/or nitryl fluoride. If solid uranium compound wherein the uranium is in a lower oxidation state is desired, the choice should be nitrosyl or nitryl chloride, bromide or iodide.

Having thus described my invention, I claim:

1. A new uranium compound having the formula $UF_7N(O)_x$ where $x$ is a whole number from 1 to 2.

2. A new uranium compound having the empirical formula $UF_7NO$.

3. A new uranium compound having the empirical formula $UF_7NO_2$.

4. A method for recovering uranium hexafluoride from a gaseous mixture containing said uranium hexafluoride and extraneous gaseous impurities by the steps which comprise reacting said mixture at a temperature in the range of $-100$ to $200°$ C. with oxyhalides of nitrogen to form a solid addition compound of uranium hexafluoride, purging the atmosphere above with resultant compound to remove said extraneous gases, and thereafter isolating the said solid uranium compound.

5. In a method of recovering uranium hexafluoride from a gaseous mixture containing said uranium hexafluoride and extraneous gaseous impurities, the steps which comprise reacting said mixture with a nitrogen oxyfluoride at a temperature in the range $-100$ to $50°$ C. to thereby form a solid compound having the empirical formula $UF_7N(O)_x$ where $x$ is a number from 1 to 2.

6. The method according to claim 5, wherein the nitrogen oxyfluoride is nitrosyl fluoride.

7. The method according to claim 5, wherein the nitrogen oxyfluoride is nitryl fluoride.

8. A method of separating uranium hexafluoride from a gaseous mixture containing said uranium hexafluoride and extraneous gaseous impurities which comprises reacting said mixture with nitrosyl chloride and thereafter recovering a solid compound having the formula $UF_6NO$—nitrosylium hexafluorouranate.

References Cited in the file of this patent

Reactor Fuel Processing, vol. 4, pp. 36, 37, October 1961.